United States Patent [19]
Thomson et al.

[11] Patent Number: 5,652,718
[45] Date of Patent: Jul. 29, 1997

[54] BARREL SHIFTER

[75] Inventors: Thomas William Schaw Thomson, Santa Cruz; Hon-Kai John Tam, Sunnyvale, both of Calif.

[73] Assignee: National Semiconductor Corporation, Santa Clara, Calif.

[21] Appl. No.: 451,444

[22] Filed: May 26, 1995

[51] Int. Cl.$^6$ .............................. G06F 7/00; G06F 15/00
[52] U.S. Cl. .......................... 364/715.08; 377/67
[58] Field of Search ...................... 364/715.08; 377/64, 377/67; 395/800

[56] References Cited

U.S. PATENT DOCUMENTS

| | | | |
|---|---|---|---|
| 4,475,173 | 10/1984 | Talmi | 364/715.01 |
| 4,583,199 | 4/1986 | Boothroyd | 395/898 |
| 4,984,189 | 1/1991 | Neki | 364/715.08 |
| 4,999,796 | 3/1991 | DeWitt et al. | 364/715.08 |
| 5,155,698 | 10/1992 | Niimi | 364/715.08 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |
| 5,416,731 | 5/1995 | Dang et al. | 364/715.08 |
| 5,465,223 | 11/1995 | Nishimura | 364/715.08 |
| 5,477,477 | 12/1995 | Saitou | 364/715.08 |
| 5,526,296 | 6/1996 | Nakahara et al. | 364/715.08 |

FOREIGN PATENT DOCUMENTS

| | | |
|---|---|---|
| 0324374 | 7/1989 | European Pat. Off. . |
| 63-150728 | 11/1988 | Japan . |

OTHER PUBLICATIONS

Serra, Micaela & Dervisoglu, Bulent I, "Testing", Chapter 79, *The Electrical Engineering Handbook*, Richard C. Dorf, Editor-in-Chief, pp. 1808–1837, CRC Press (no publication date).

L-T Wang et al., "Feedback Shift Registers For Self-Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power-On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc. (no publication date).

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32 1993.

*Primary Examiner*—Paul P. Gordon
*Assistant Examiner*—Robert J. Dolan
*Attorney, Agent, or Firm*—Limbach & Limbach, L.L.P.

[57] ABSTRACT

A barrel shifter performs multi-bit shift and rotate operations on data of different lengths using multiplexors to preprocess the data prior to introducing the data to a transistor array.

1 Claim, 2 Drawing Sheets

BARREL SHIFTER

BACKGROUND OF THE INVENTION

The present invention relates to the design of a barrel shifter utilizable in a microprocessor execution unit architecture.

SUMMARY OF THE INVENTION

A barrel shifter is disclosed which can shift or rotate data of various sizes, such as 8-bit, 16-bit or 32-bit.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
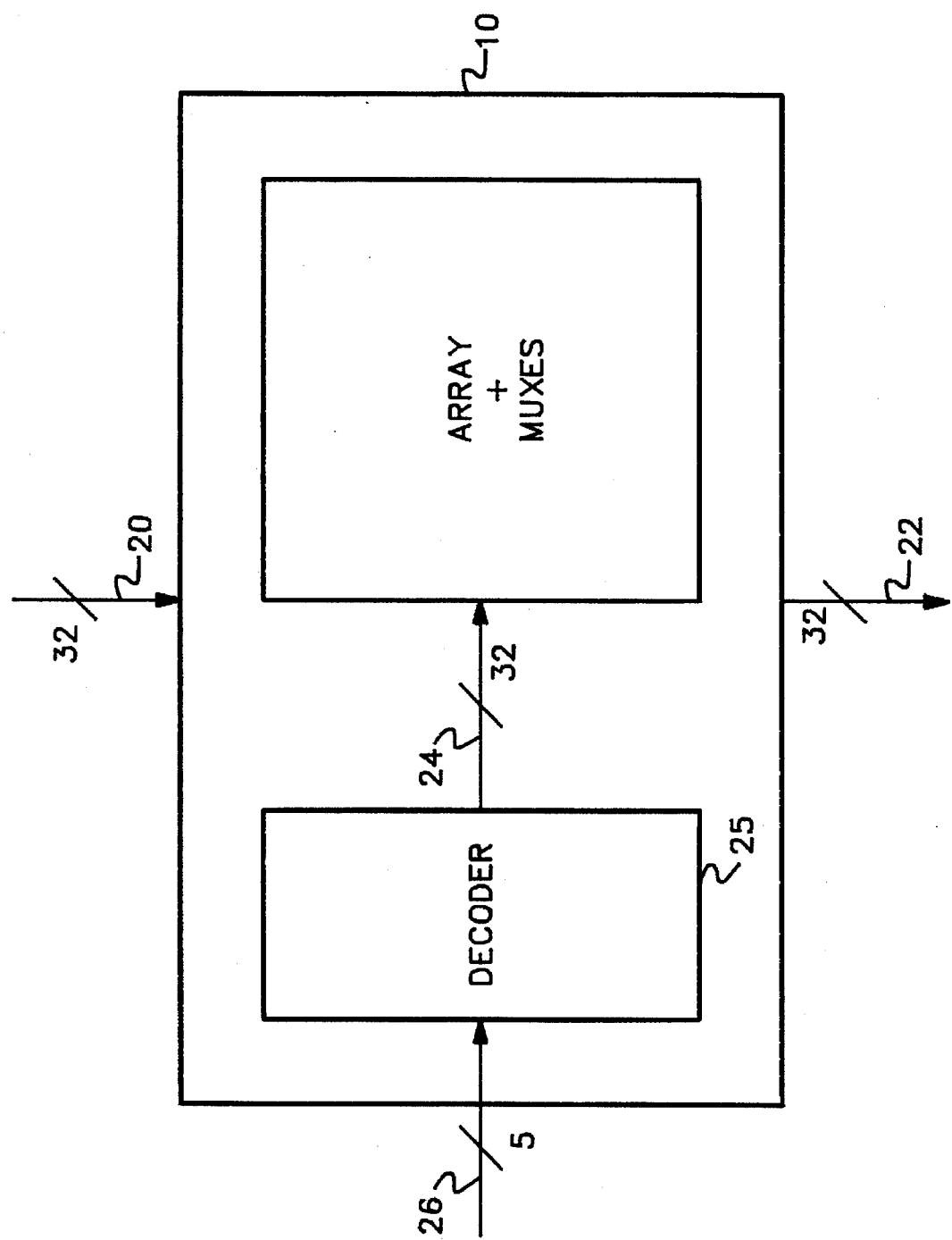
FIG. 1 is a functional block diagram of a barrel shifter.

A generalized block diagram of a barrel shifter 10 according to the present invention is illustrated in FIG. 1. An operand is presented to the barrel shifter on input 20 and the result is presented on output 22. Signals which control how much the operand is rotated are presented to the barrel shifter at input 24, and these signals are translated from a binary encoded value of the rotate amount received at input 26 of decoder 25. The barrel shifter 10 performs multi-bit shift and rotate operations compatible with the x86 instruction set.

Figure 2:
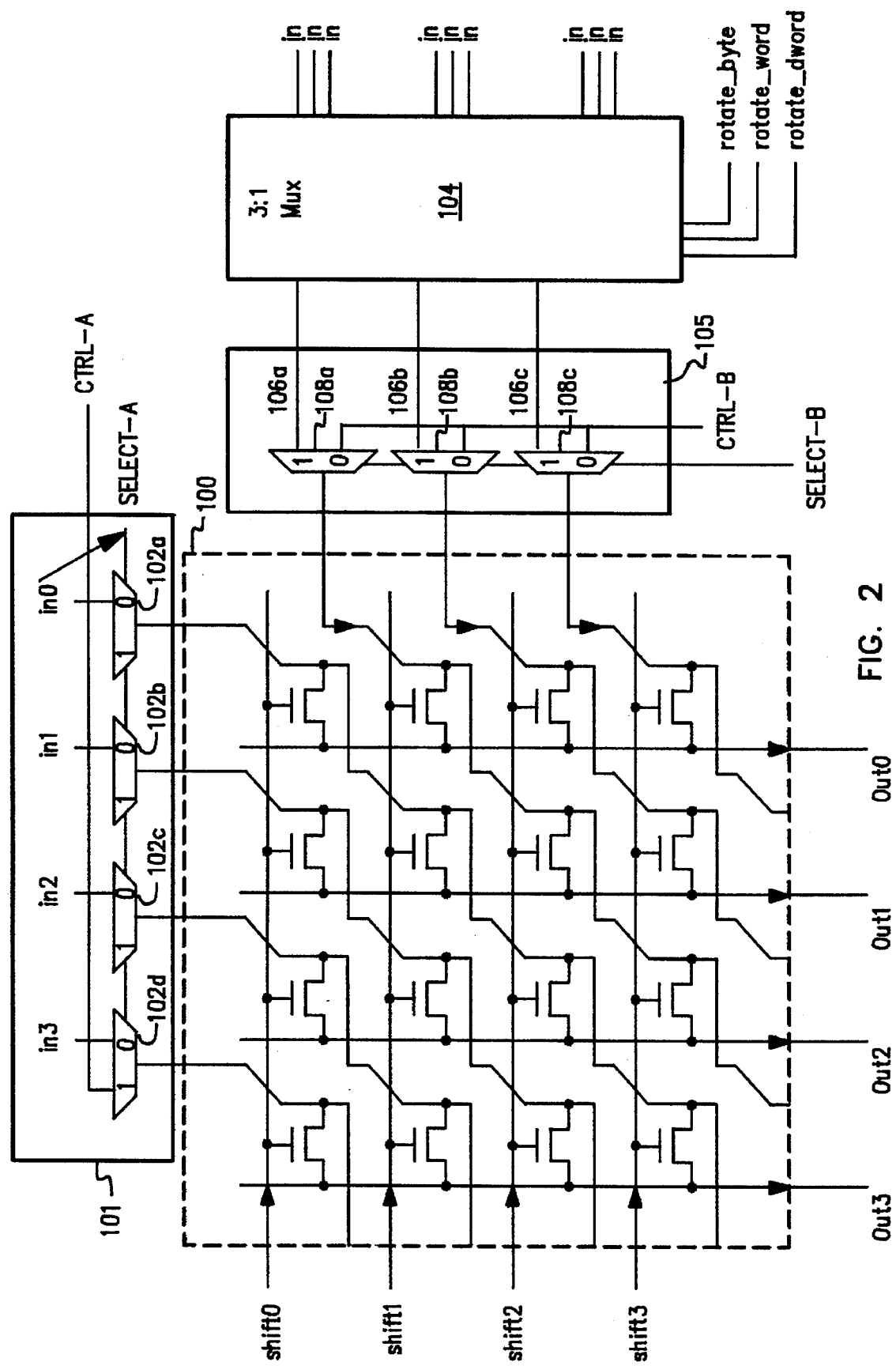
FIG. 2 is a schematic diagram of a barrel shifter.

Referring now to FIG. 2, a more detailed schematic diagram of barrel shifter 10 is illustrated. In the preferred embodiment, the barrel shifter includes a 32 by 32 transistor array, but in FIG. 1, only a 4 by 4 portion of the transistor array 100 is shown. Further, the preferred embodiment performs left shifts only, therefore, a shift right instruction will be translated to a complementary shift left instruction.

Each bit in0, in1, in2, in3 of the operand is presented to a 32 bit 2:1 multiplexor, respresented schematically as a collection of 2:1 input gates 102a, 102b, 102c, 102d, respectively. Each input gate has a second input CRTL-A, which is a control signal from a control logic unit in the microprocessor system (not shown) that provides a value for the barrel shifter to shift into the most significant bit of the operand. The enable signal SELECT-A for each input gate is determined according to which microcoded instruction is being executed by the control logic, such as SAR, SHR, or RRC.

Each output bit from the multiplexor is connected to one transistor in each of the 32 rows of array 100 in ascending bit positions, thereby forming a connection diagonally across the array, i.e., in the second row, the bit is moved left one place, in the third row, the bit is moved left two places, and so on.

The operand is also connected to respective inputs of a 31 bit 3:1 multiplexor 104. The most significant bit is either in7, in15, in31, depending on the data type which is indicated by control signals ROTATE_BYTE, ROTATE_WORD, OR ROTATE_DWORD. As used herein, a byte is 8 bits of data, a word is 16 bits of data, and a dword is 32 bits of data. Bytes and words have their data shifted left to the most significant places and the less significant bits are filled with zeros. The most significant bit is output on line 106a. Likewise, the second most significant bit is selected from the group of three inputs in6, in14, in30, and so forth for all bit positions.

A second multiplexor group is formed by input gates 106a, 106b, 106c. Each input gate has a second input CRTL-B which provides a value from the control logic for the barrel shifter to shift into the least significant bit of the operand. The enable signal SELECT-B for each input gate is determined according to which microcoded instruction is being executed by the control logic, such as SHR, SHL, or RLC.

Each output bit from the multiplexor is connected to one transistor in each of 31 rows (starting with the second row) of array 100 in ascending bit positions, thereby forming a connection diagonally across the array, i.e., in the third row, the bit is moved left one place, in the fourth row, the bit is moved left two places, and so on.

The barrel shifter 10 may be used to carry out multi-bit shift and rotate operations. For example, an instruction to shift an operand "FEDCBA98" 12 places to the right will be executed as a shift left of 20 places. The operand is placed into both multiplexors 101, 104 and shifted left 20 places. This results in the most significant 12 bits of the output 22 coming from the least significant 12 bits which are input to multiplexor 101, and the least significant 20 bits of the output 22 coming from the most significant 20 bits of the data coming from multiplexor 104. The correct answer "000FEDCB" is thus obtained.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319 entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452, 162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, now U.S. Pat. No. 5,546,353, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, now U.S. Pat. No. 5,541,935, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

It should be understood that the invention is not intended to be limited by the specifics of the above-described embodiment, but rather defined by the accompanying claims.

What is claimed is:

1. A barrel shifter, comprising:

an n-bit by n-bit transistor array arranged into n rows and n columns, wherein the source of a transistor in one row is connected to the source of a transistor in the next row;

a first plurality of multiplexors, each having a first and a second input and an output, wherein the first input is coupled to a corresponding bit of an operand, the second input is coupled to a first control signal, and the output is coupled to one transistor in each row of the array beginning with a transistor in a corresponding bit position in the first row and continuing with transistors in ascending bit positions for each subsequent row;

a second plurality of multiplexors each having inputs and an output, each multiplexor selecting one of three inputs depending on the data length; and a third plurality of multiplexors, each having a first and a second input and an output, wherein the first input is coupled to a corresponding bit output of the second multiplexor, the second input is coupled to a second control signal, and the output is coupled to one transistor in each row of the array beginning with a transistor in a corresponding bit position in the second row and continuing with transistors in ascending bit positions.

* * * * *